(12) United States Patent
Srikanteswara et al.

(10) Patent No.: US 10,225,743 B2
(45) Date of Patent: Mar. 5, 2019

(54) RADIO SPECTRUM SHARING

(71) Applicant: Intel Corporation, Santa Clara, CA (US)

(72) Inventors: Srikathyayani Srikanteswara, Portland, OR (US); David E. Ott, Chandler, AZ (US); Eve M. Schooler, Portola Valley, CA (US)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 15/413,985

(22) Filed: Jan. 24, 2017

(65) Prior Publication Data
US 2018/0146380 A1 May 24, 2018

Related U.S. Application Data

(60) Provisional application No. 62/424,985, filed on Nov. 21, 2016.

(51) Int. Cl.
*H04W 16/14* (2009.01)
*H04W 72/04* (2009.01)

(52) U.S. Cl.
CPC ....... *H04W 16/14* (2013.01); *H04W 72/0446* (2013.01); *H04W 72/0453* (2013.01)

(58) Field of Classification Search
CPC .......... H04L 2012/5608; H04W 84/12; H04W 88/08; H04W 88/18; H04W 80/04; H04W 88/06; H04W 84/18; H04B 7/2045; H04B 7/2123; H04B 7/208; H04B 7/212
USPC ............. 370/310.2, 319, 322, 329, 349, 344
See application file for complete search history.

(56) References Cited

U.S. PATENT DOCUMENTS

| | | | |
|---|---|---|---|
| 2015/0181601 A1* | 6/2015 | Schmidt | H04W 12/08 370/329 |
| 2015/0358968 A1* | 12/2015 | Malladi | H04W 16/14 455/454 |
| 2015/0373554 A1 | 12/2015 | Freda et al. | |
| 2016/0330743 A1 | 11/2016 | Das et al. | |

FOREIGN PATENT DOCUMENTS

WO 2016182634 11/2016

OTHER PUBLICATIONS

"International Application Serial No. PCT/US2017/057352, International Search Report dated Jan. 29, 2018", 3 pgs.
"International Application Serial No. PCT/US2017/057352, Written Opinion dated Jan. 29, 2018", 9 pgs.

(Continued)

*Primary Examiner* — Brenda H Pham
(74) *Attorney, Agent, or Firm* — Schwegman Lundberg & Woessner, P.A.

(57) ABSTRACT

System and techniques for radio spectrum sharing are described herein. A free radio spectrum block may be identified. An identification packet of the free radio spectrum block may be published. Here, the identification packet may include at least one of available spectrum, time, or area corresponding to the free radio spectrum block. An acknowledgement to the identification packet may be received. A provider of the free radio spectrum block may then be caused to cease radio communication on the available spectrum for the time and area specified in the identification packet.

25 Claims, 7 Drawing Sheets

(56) References Cited

OTHER PUBLICATIONS

"Extensible Authentication Protocol Method for 3rd Generation Authentication and Key Agreement (EAP-AKA)", https: tools.ietf. org html rfc4187 Accessed on Feb. 13, 2018, (Jan. 2006), 80 pgs.
"802.1x Authentication Chapter 9", Arubanetworks, http: www. arubanetworks.com techdocs ArubaOS_60 UserGuide 802.1x.php Accessed on Feb. 13, 2018, 32 pgs.

* cited by examiner

RADIO SPECTRUM SHARING

CLAIM OF PRIORITY

This patent application claims the benefit of priority, under 35 U.S.C. § 119, to U.S. Provisional Application Ser. No. 62/424,985, titled "INFORMATION-CENTRIC NETWORKING METHODS AND APPARATUSES" and filed on Nov. 21, 2016, the entirety of which is hereby incorporated by reference herein.

TECHNICAL FIELD

Embodiments described herein generally relate to radio communications and more specifically to radio spectrum sharing.

BACKGROUND

Radio communications involve encoding information in photons that are received and decoded to pass information. Generally, the photons selected for communication are within a set or range of frequencies, which may be called the radio spectrum. Typically, multiple communications in the same radio spectrum at the same time interfere with each other. A number of techniques have been developed to address this interference, such as multiple-input multiple-output (MIMO) type special diversity, orthogonal codes, etc. An additional technique is coordinated use of a radio spectrum between transmitters. For many portions of the radio spectrum, the coordination is enforced via licensing. That is, only those entities that hold a license may use certain radio spectrum resources. In some circumstances the licensed bands are exclusive to an operator and in other circumstances the licensed bands are shared by operators. Other portions of the spectrum are unlicensed, and, depending on the protocol, may coordinate interference mitigation or transmit when no other transmissions are occurring.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
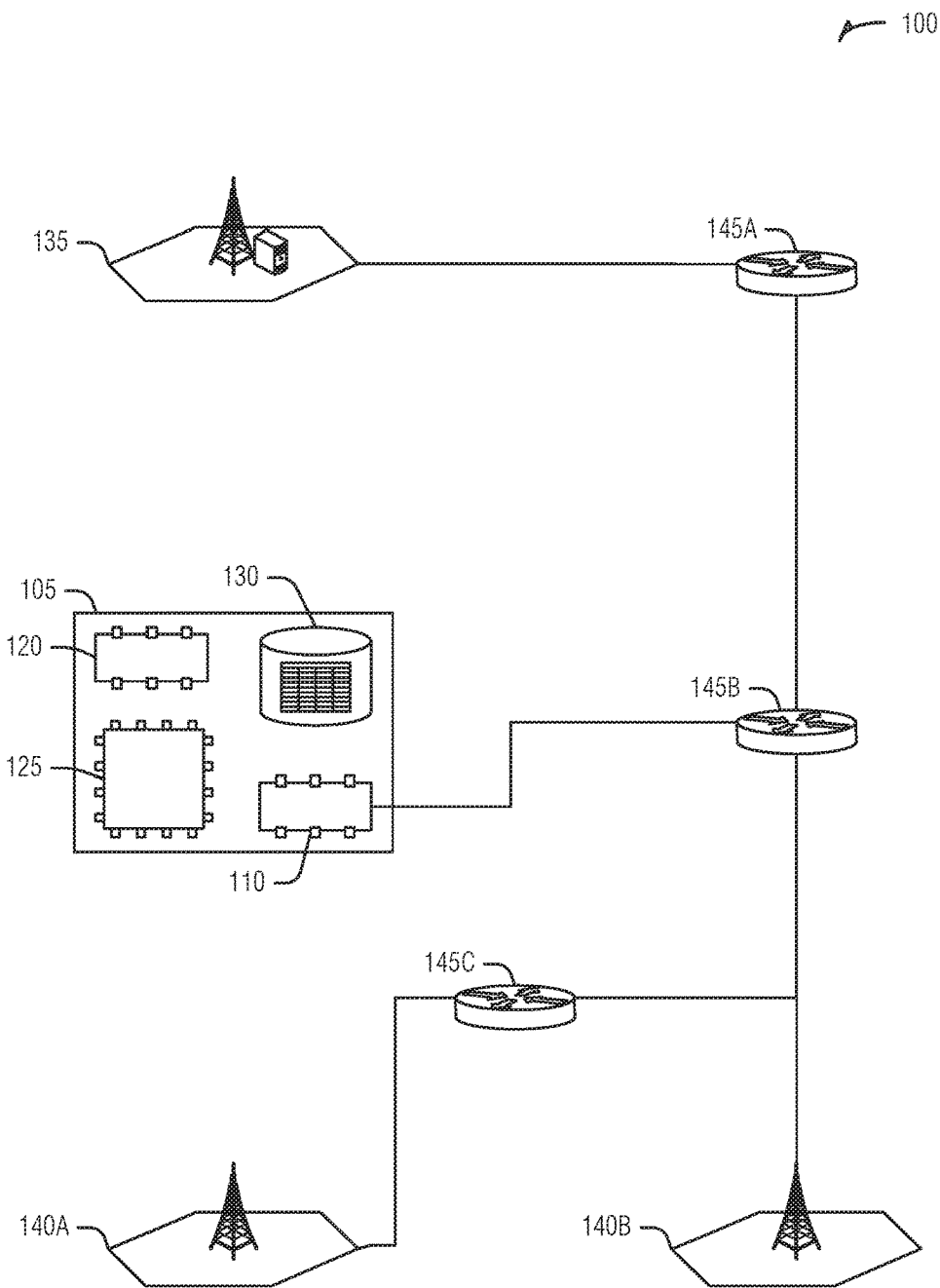
FIG. 1 is a block diagram of an example of an environment including a system for radio spectrum sharing, according to an embodiment.

While a licensed spectrum user (e.g., an incumbent) has a right to use their allocated spectrum, there are many times in which the incumbent has no use for the spectrum. At these times, it would improve spectral efficiency of radio communications to allow another device that has a right to use the spectrum to use it. Spectrum coordination, between licensed users, unlicensed users, or others (e.g., with an intermediate level of licensing such as priority users), provides a mechanism to share radio spectrum when it is not being used.

Scarcity of spectrum resources has led to the search for new techniques to better utilize allocated spectrum, for example, under six hertz (Hz). Spectrum sharing allows the incumbent of a licensed frequency band to share their spectrum with another user in a controlled manner during periods of planned idleness, for example. Spectrum sharing is now becoming mainstream with the introduction of Licensed Shared Access (LSA) for 2.3 gigahertz (GHz) in the European Union and Spectrum Access System (SAS) for 3.5 GHz in the United States of America. LSA is a two tier licensed sharing between incumbents and operators while SAS is a more complex three tier sharing design that includes forms of licensed and un-licensed sharing. Other regulatory entities (e.g., countries) are also investigating augmenting commercial cellular and broadband spectrum using sharing mechanisms. The myriad of different solutions likely to emerge from different regulatory entities will likely result in complex networks and network entities, increasing costs and reducing efficiencies.

Further to the architectural complexities discussed above, typical radio spectrum coordination techniques often involve either the incumbent, or the potential users, to constantly communicate with each other, such as through heartbeats, anticipated use reports, or broadcasts of spectrum availability. This processing overhead may be significant and will grow as the number of potential users grows, such as is expected to happen as more and more internet-of-things (IoT) devices are deployed.

To address the prolific network traffic used to synchronize the needs of potential radio spectrum users and incumbents, information centric networking (ICN) may be used to implement an efficient radio spectrum sharing system and protocol. ICN is an umbrella term for a new networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine, and does not use addresses. Instead, to get content, a device requests named content from the network itself. The content request may be called an interest and transmitted via an interest packet. As the interest packet traverses network devices (e.g., routers), a record of the interest is kept, for example, in a pending interest table. When a device that has content matching the name in the interest is encountered, that device may send a data packet in response to the interest packet. Typically, the data packet is tracked back through the network to the source by following the traces of the interest left in the network devices.

Matching the named data in an ICN may follow several strategies. Generally, the data is named hierarchically, such as with a universal resource identifier (URI). For example, a video may be named www.somedomain.com/videos/v8675309. Here, the hierarchy may be seen as the publisher. "www.somedomain.com," a sub-category, "videos." and the canonical identification "v8675309." As an interest traverse an ICN, ICN equipment will generally attempt to match the name to a greatest degree. Thus, if an ICN device has a cached item or route for both "www.somedomain.com/videos" and "www.somedomain.com/videos/v8675309," the ICN device will match the later for an interest packet specifying "www.somedomain.com/videos/v8675309." In an example, an expression may be used in matching by the ICN device. For example, the interest packet may specify "www.somedomain.com/videos/v8675*" where '*' is a wildcard. Thus, any cached item or route that includes the data other than the wildcard will be matched. In an example, additional meta-data may be attached to the interest packet, the cached data, or the route, to provide an additional level of matching. For example, the data name may be specified as "www.somedomain.com/videos/v8675309." but also include a version number—or timestamp, time range, endorsement, etc. In this example, the interest packet may specify the name and also the version number, or version range, desired. The matching may then locate routes or cached data matching the name and then perform the additional comparison of meta-data or the like to arrive at an ultimate decision as to whether data or a route matches the interest packet for responding to the interest packet or forwarding the interest packet respectively.

ICN has advantages over host-based networking because the data segments are individually named. This permits aggressive caching throughout the network as a network device may provide a data packet in response to an interest as easily as an original author. Accordingly, it is less likely that the same segment of a network will transmit duplicates of the same data requested by different devices. Such an architecture is useful when a network branches from a central information provider to many leaves, such as occurs in many IoT deployments.

Fine grained encryption is another feature of many ICN networks. A typical data packet includes a name for the data that matches the name in the interest packet. Further, the data packet includes the requested data and may include additional information that may, for example, be used to filter similarly named data (e.g., by creation time, expiration time, version, etc.). In order to address malicious entities providing false information under the same name, the data packet may also encrypt its contents with a publisher key or provide a cryptographic hash of the data and the name. Thus, knowing the key (e.g., from a certificate of an expected publisher) allows the recipient to ascertain whether the data is from that publisher. This technique also allows the aggressive caching of the data packets throughout the network because each data packet is self-contained and secure. This is in contrast to many host-based networks that rely on encrypting a connection between two hosts to securely communicate. With connection encryption, the network devices have no access to the data in order to cache the data.

Example ICN networks include content centric networking (CCN), as specified in the Internet Engineering Task Force (IETF) draft specifications for CCNx 0.x and CCN. 1.x, and named data networking (NDN), as specified in the NDN technical report DND-0001.

The network benefits of ICN may be leveraged to provide an efficient spectrum sharing system and technique. Devices desiring to share an incumbent's spectrum may provide an interest that names the spectrum. The name, or the interest packet, may also provide filtering parameters for radio spectrum use, such as a geographical location—it would be acceptable, for example, for two devices to use the same radio spectrum at the same time if they are separated in space enough, such as in different cities—time, etc. Because the network itself maintains the pending interests, the devices do not have to continually transmit additional requests to the incumbent. Similarly, when the incumbent has spectrum to share, the incumbent may publish (e.g., in response to an interest, or to a network cache, etc.) a data packet including the name and, for example, a list of free radio spectrum block parameters (e.g., an identification packet). As these are delivered back to the original requesters, the incumbent may subscribe (e.g., by transmitting an interest packet, or registering with a network subscription service) to acknowledgements to the identification packet. When a device uses a portion of the free radio spectrum block, that device provides an acknowledgment, which is delivered to the incumbent, and the incumbent will cease operating on the free radio spectrum block.

Because each network segment need transmit an interest or data packet for the same named data only once, redundant traffic between incumbent and user devices is minimized, allowing for much greater device participation on, for example, the same up-stream network segments. Further, because the incumbent and the user devices may efficiently and securely communicate directly, many of the proposed network entities to manage interactions may be eliminated, resulting in a more robust and efficient radio spectrum sharing system.

FIG. 1 is a block diagram of an example of an environment 100 including a system 105 for radio spectrum sharing, according to an embodiment. The system 105 includes a transceiver 110 and a scheduler 120. The illustrated processing circuitry 125 (e.g., processor) may provide an implementation of all or portions or either the transceiver 110 or the scheduler 120. All of the components of the system 105 are implemented in electronic hardware, such as that described below with respect to FIG. 7 (e.g., circuitry).

As illustrated, the system 105 is communicatively coupled, when in operation, to an incumbent 135 system as well as user 140 systems (e.g., user system 140A and 140B), via ICN devices 145 (e.g., ICN device 145A, 145B, and 145C). The transceiver 110 manages communications over the ICN devices 145 to the incumbent 135 and users 140. Although illustrated as a single device, the transceiver 110 may be implemented with multiple hardware interfaces over wired or wireless media. In an example, the system 105 is part of the incumbent 135 system, and may use alternative communication mechanisms (e.g., circuit based, host based, via a bus, etc.) techniques to communicate with other parts of the incumbent 135 system.

The scheduler 120 is arranged to manage free spectrum information between the incumbent 135 and the users 140. The scheduler 120 may store free spectrum information in a local data store 130 (e.g., memory, solid state storage, hard disc drive, etc.), or, in an example, remotely. Activities of the scheduler 120 and the transceiver 110 may be coordinated, or directed, by the processing circuitry 125. In an example, the processing circuitry 125 is absent from the system 105, the transceiver 110 and the scheduler 120 are each arranged to communicate with each other directly (e.g., via a bus, via direct memory access, etc.).

The scheduler 120 is arranged to identify a free radio spectrum block. Here, the free radio spectrum block includes a radio frequency, or set of frequencies, as well as a time, that the incumbent 135 will not be using. Thus, the free radio spectrum block defines transmission parameters, including time, that may be used by the users 140. In an example, the free radio spectrum block also includes a geographic location. Example geographic locations may include a city, state, or other municipal boundary. In an example, the geographic location may be a coordinate, such as defined by a satellite navigation system, and, in an example, a radius or other geographic shape define in relation to the coordinate. In an example, the free radio spectrum block includes a transmit power that proscribes a maximum transmit power to be used by the users 140 with the other parameters of the free radio spectrum block.

In an example, to identify the free radio spectrum block, the scheduler 120 interfaces with the incumbent 135 on a periodic basis to retrieve or receive a current schedule of free radio spectrum blocks. In an example, the scheduler 120 maintains an interest packet in the ICN devices 145 for the schedule or for a set of pre-defined blocks. These predefined blocks may include predefinitions of spectrum, location, and transmit power, without a time of the block specified. Such a predefinition may provide for a convenient data name, the name being composed of the non-time parameters that the system 105 or the users 140 may provide to the ICN devices 145 as an interest. The incumbent 135 of the system 105 need simply provide a data packet with a payload of the time period to the interest to communicate the free radio spectrum block.

As noted above, ICN provides efficient communications when, for example, the number of users 140 grows large. The benefits of ICN may be found in properly crafting a communications protocol between the incumbent 135 and users 140. Part of this protocol is naming. Because ICN networks operate on names given to data, the names being central to routing and caching techniques of ICN, incorrectly naming data may cause inefficient production of interests by, for example, the users 140, and thus an inefficient network generally. The example above regarding predefined parameters of a free radio spectrum block being part of the name is an example of an efficient name. There, the name may be composed of, for example, a spectrum, a location, or a provider (e.g., incumbent 135). Thus, the users 140 may, for example, provide an interest for data named /IncumbentA/ 3.5 GHz/Channel2/Chicago to the ICN devices 145 (e.g., to ICN device 145C and device 145B). When a freed radio block matching the name is available, the system 105 may respond with a data block that includes additional information, such as a time period for the block or a transmit power for the block. In accordance with ICN principles, the data packet will be sent once across each network segment until it reaches the users 140. Thus, at ICN device 145, the data packet will be split to communicate to both user 140A and 140B, but not before.

To carry out the communications from the system 105 to the users 140, the transceiver 110 is arranged to publish an identification packet of the free radio spectrum block. In an example, the identification includes available spectrum, time, and area corresponding to the free radio spectrum block. In an example, one or more of the available spectrum, time or area (e.g., location, geographic location, etc.) are part of the data name. The transceiver 110 may publish the identification packet in a number of ways. In an example, the identification packet is a data packet provided in response to an interest packet from the users 140. In an example, the identification packet is a data packet, or just a data payload, pushed to the ICN device 145B, which operates as a network cache. Thus, in this example, the system 105 pushes the identification packet to the ICN network when, for example, the data is available. In an example, the transceiver may publish the identification packet as an interest packet to the ICN network devices 145. In this example, the interest packet includes the free radio spectrum block parameters as either part of its name or as meta-data. The users 140 may then respond to the identification packet interest if they want to use the resources defined by the free radio spectrum block.

The transceiver 110 is arranged to receive an acknowledgement to the identification packet. The specific form of the acknowledgment will depend on the type of publication used for the identification packet or details of the ICN network. For example, where the publication is a data packet in response to an interest from the users 140, the acknowledgement may be a data packet from the users 140 in response to an interest by the system 105 after sending the identification packet. Such an interest may include the same name used for the data with an acknowledgement flag, an acknowledgment addition to the name, or, by the protocol, not specifically request acknowledgment but be understood by the users 140 to be a request for an acknowledgment having followed the users 140 original interest. Where publication of the identification packet is an interest, the acknowledgment may be a data packet response from one or more of the users 140.

In an example, the interest behind the identification packet publication, or any interest used to acquire an acknowledgment, may include a count parameter. In traditional ICN, an interest is removed from an ICN device 145 after a responsive data packet passes through the ICN device. In this case, however, the interest will persist, for example in an pending interest table (PIT) of the ICN device 145, until a certain number of responsive data packets pass. This technique adds a small amount of data to the interest packet but avoids the system 105 from having to send out an interest packet for every expected acknowledgment. The interest packet with the acknowledgment count may also include an expiration time to allow ICN devices 145 to remove the pending interest from the PIT even if the designated number of responsive data packets has not yet passed through the ICN device 145. Thus, in an example, subscribing to the pending interest includes specifying a number of expected acknowledgements. As noted above, the number of expected acknowledgments cause a pending interest controller (e.g., ICN device 145A) to keep the pending interest for at least as many acknowledgments as specified. In an example, an expiration time, or time to live (TTL) may accompany the expected acknowledgments to permit efficient cache eviction of the pending interest by the ICN devices 145.

It cases where the ICN network provides an inherent acknowledgment (e.g., where the network provides an acknowledgment facility itself), subscribing, or receiving, acknowledgments may simply be an expected part of the ICN communication rather than being implemented via specific interests or data responses. However, specifically providing an interest by the system 105 to acquire the acknowledgment may provide an additional benefit of, for example, licensee information from the user 140A, in cases in which other users (e.g., the user 140B) are not licensed to use the free radio spectrum block. In an example, correct identification of authorized users 140 may be taken care of via the inherent encryption available in many ICN networks. Thus, the data of the identification packet may be encrypted with a key shared between the incumbent 135 and the user 140A during licensing. Thus, even if the identification packet matches an interest from the user 140B, the user 140B will be unable to decode the payload to complete the transfer of radio spectrum control to itself while the user 140A will be able to decode the payload.

Once the publication of the identification packet and receipt of the acknowledgments is complete, the system 105 may determine which users 140 may use the resources of the free radio spectrum block. In some cases, multiple users 140 may be able to use portions of the free radio spectrum block. For example, if the free radio spectrum block includes two locations, the user 140A may use the resources at the first location and the user 140B may use the resources at the second location. Additional details of possible use scenarios are described below.

After one or more of the users 140 will use resources from the free radio spectrum block, the scheduler 120 is arranged to cause a provider of the free radio spectrum block (e.g., the incumbent 135) to cease radio communication on the available spectrum for the time and area specified in the identification packet. Generally, the incumbent 135 will provide the free radio spectrum block when it does not intend to use the radio resources, however, the scheduler's action provides notification to the incumbent 135 that another entity (e.g., one or more of the users 140) are actually using the radio resources. In an example, to cause the provider to cease radio communication, the scheduler 120 does not communicate with the provider. In this example, the protocol includes the provider ceasing radio communications for the free radio spectrum block upon notification to the scheduler 120.

In an example, the incumbent 135 may wish to reclaim the radio resources of the free radio spectrum block. This may occur in any number of examples, such as when the free radio spectrum block does not define a termination time, when a rescheduling of incumbent work requires use of the radio resource, etc. In order to address reclamation of the radio resources, the transceiver 110 is arranged to transmitting a reclamation packet. In an example, the reclamation packet may be a data packet responsive to an interest that the users 140 are required to maintain during their use of the radio resources. In an example, the reclamation packet is an interest to which the users 140 will respond if they are using the radio resources. The scheduler 120 then causes resumption of use of a radio spectrum of the free radio spectrum block in response to a reclamation acknowledgment to the reclamation packet. If, for example, there are multiple acknowledgments expected (e.g., as known from the number of awards given in response to the identification packet), the reclamation packet may be configured to persist in the ICN devices 145 until all reclamation acknowledgments have been received. Thus, for example, a reclamation interest packet may be configured to persist until a number of responsive data packets equaling the number of users 140 awarded radio resources from the identification packet have passed through the ICN devices 145.

For free radio spectrum blocks in which a limited number of users 140 may use the resources, a variety of selection criteria may be employed by the scheduler 120 to determine which of the users 140 may use the radio resources. In an example, the selection criteria may include codified business relationships, such as a licensee hierarchy, where the users' place in the hierarchy resolves conflicts between users 140. In an example, the users 140 may be ranked by importance. For example, if user 140A is an emergency services device (e.g., fire alarm, police communications, etc.) and user 140B is a commercial device (e.g., point-of-sale device), then a predefined ranking of the users 140, for example maintained in the data store 130, may provide the mechanism by which to select which of the users 140 will be awarded the radio resources of the free radio spectrum block. In an example, prior use may be used to rank the users 140. Thus, for example, if the user 140A has been awarded previous free radio spectrum blocks more than the user 140B. 140B will be ranked higher (or lower) than the user 140A.

In an example, users 140 may bid for the free radio spectrum block. The bid may include a promise or transfer of money, an exchange of resources (e.g., preference or award of radio, network, or computation resources), etc. In an example, to implement this auction, within the environment 100, the identification packet may include an auction option. Thus, either in an interest or data packet underlying the identification packet, an indication that the free radio spectrum block is awarded by auction is included. In an example, the auction option specifies one or more of a time period for the auction, a list of eligible users 140, a currency or resource eligible to use for a bid, a reserve bid value, settlement information, or other parameters of the auction. In an example, to implement the auction, the transceiver 110 is arranged to receive a set of bid acknowledgments in response to the auction option. In an example, a bid acknowledgement in the set of bid acknowledgements includes a bid value and a nonce. The nonce is a cryptographic entity that is generated by a bidder. The nonce permits an anonymous bidding process because only the bidder that generated the nonce knows it is theirs. Other bidders may see the nonce as part of, for example, an interest packet seeking a final acknowledgement from the auction winner if the nonce is not part of the data name, but will be unable to connect the nonce to the particular bidder.

The scheduler 120 is arranged to apply a selection criterion to the set of bid acknowledgements to select a member of the set of bid acknowledgments as a winner. The criterion may include the highest bid, the highest bid within a user class (e.g., preferred users, general access users, etc.), etc. After the scheduler 120 selects the winner member, the transceiver 110 is arranged to publish an auction complete packet. In the example discussed above where the bidders included a nonce, the auction complete packet includes the nonce of the winning bidder (e.g., the selected member). The winning bidder may then provide the final acknowledgement to the identification packet described above and then use radio resources of the free radio spectrum block. The previous auction example included a single round for the bidding. However, in an example, multiple rounds of bidding may be implemented with the transceiver 110 publishing supplemental identification packets at the conclusion of each round of an auction. Here, each supplemental identification packet indicates a round winner (e.g., via the nonce) and bid value where the round winner was determined by the scheduler 120 based on the selection criterion. The transceiver 110 is also arranged to receive receiving supplemental bid acknowledgments in response to the supplemental identification packets until the auction expires. At this point, the last round of bidding operates like the only round of bidding in the single round example described above.

The system 105, as described above, provides a robust and general technique for sharing radio resources from the incumbent 135 to users 140. Some current radio spectrum sharing frameworks, however, define specific entities or transactions for sharing radio spectrum. Two example frame works are the Licensed Shared Access (LSA) framework of the European Union on the 2.3 GHz band and Spectrum Access System (SAS) of the United States of America on the 3.5 GHz band. Some additional details of these frameworks are discussed below with respect to FIGS. 2 and 4 respectively. However, the discussion below includes modifications to the system 105 to be compliant with LSA or SAS.

In the case of LSA, the scheduler 120 is arranged to obtain a parameter of the free radio spectrum block from a licensed shared access (LSA) incumbent 135. Thus, in environment 100, the incumbent 135 holds the license to the radio resources and thus has a right to use the radio resources. The transceiver 100 is arranged to receive an interest packet from an LSA licensee (e.g., user 140A). Here, the interest packet includes an indication of the parameter. The parameter here is either a portion of the data name or included in the interest and responsive data packets. The parameter may be a time period, a channel, a sub-channel, area, or other element of the free radio block. Because the incumbent 135 is licensed, it is possible that less information is needed for the users 140 to identify the radio resources, as these may already be defined by the license.

The transceiver's publication of the identification packet includes transmitting the identification packet to the LSA licensee (e.g., user 140A). In an example, transmitting the identification packet to the LSA licensee includes encrypting the identification packet with a key for the LSA licensee. Here, the encryption may be payload based, or otherwise organically supported by the ICN devices 145. Encrypting the payload ensures that only those users 140 with a radio spectrum sharing agreement may ultimately use the radio resources defined by the free radio spectrum block. Thus, in an example, the key used to encrypt the payload may be acquired prior to receipt of the interest packet, at for example, a time when the user 140A completed the agreement with the incumbent 135.

In an example, the transceiver 110 is arranged to transmit a reclamation data packet in response to a reclamation interest packet maintained by the LSA licensee during a period of use of the free radio spectrum block by the LSA licensee. In this example, the LSA licensee is arranged to maintain a reclamation interest packet during the time period of the free radio spectrum block. The scheduler 120 is arranged to cause resumption of use of a radio spectrum of the free radio spectrum block (e.g., by the incumbent 135) in response to a reclamation acknowledgment by the LSA licensee.

The above examples illustrate an elegant solution to implement LSA in an ICN. The SAS examples below are a little more complicated, however, the principle benefits of efficient network communications to timely share radio spectrum information are maintained.

To implement SAS, the scheduler 120, when identifying the free radio spectrum block, is arranged to obtain a parameter of the free radio block from an incumbent 135. Again, as in the LSA example, the incumbent 135 is licensed and ultimately has the right to use the radio resources defined in the free radio spectrum block. In an example, to obtain the parameter of the free radio block from the incumbent 135, the scheduler 120 is arranged to register with a system of the incumbent 135. This registration permits the system 105 to operate as the SAS and share radio spectrum information for two or more incumbents.

The transceiver 110 is arranged to receive an interest packet from a general authorized access (GAA) device (e.g., user 140A). GAA users are typically unlicensed users that may compete with any other device when transmitting. In this example, the interest packet includes an indication of the parameter. In an example, to publish the identification packet, the transceiver 110 transmits the identification packet to the GAA device. In an example, to publish the identification packet, the transceiver 110 is arranged to transmit the identification packet to multiple GAA devices. In this example, the unlicensed nature of GAA devices permits any or all respondents to use the radio resources of the free radio spectrum block.

In an example, the identification packet includes a version indication. Versioning the identification packet allows a more long-lived schedule of the free radio spectrum resources to be published and persist in the ICN devices 145. Thus, for example, the incumbent may not be using its spectrum allocation every night of the week from 20:00 to 23:00. A single transmission with the schedule may be sent to the user 140A through the ICN devices 145 and cached at one or more of the ICN devices 145. This transmission may be in response to an interest packet sent through ICN device 145C from the user 140A requesting the schedule. If the schedule changes, the incumbent 135, via the system 105, may simply publish a new version of the schedule having the same name, the new version superseding the preceding version. In an example, the identification has a name with a geographical location. Thus, the schedule may be published with an easy way for interest packets to be formulated such that the ICN devices 145 deliver the relevant schedule.

In an example, the transceiver 110 is arranged to receive a registration request from the GAA device. The scheduler 120 may then register the GAA device. In an example, to register the GAA device, the scheduler 120 provides the GAA device with an encryption key to decrypt the identification message. In an example, the encryption key is common across GAA devices that are registered. Thus, GAA users may decrypt the packet, but others may not. In an example, the encryption key is common across SASs (e.g., the system 105 and another SAS). This commonality permits any SAS from providing the identification packet to the ICN devices 145 for any incumbent 135.

SAS also has the concept of a priority access licensee (PAL) (e.g., user 140B), which is similar to the licensee in LSA. The PAL has greater rights to the radio resources that the GAA devices, but fewer than the incumbent 135. In an example, the scheduler 120 is arranged to receive (e.g., via the transceiver 110) a second interest packet from PAL, the interest packet including an indication of the parameter. The transceiver 110 is also arranged to receive a registration request from the PAL and the scheduler 120 is arranged to register the PAL. In an example, to register the PAL, the scheduler 120 is arranged to provide the PAL with an encryption key to decrypt the identification message. In an example, the encryption key is unique to the PAL and the SAS (e.g., the system 105) providing the registration. Thus the same key may be used by two different users 140, but not at the same SAS. In an example, the encryption key is unique to the PAL. This case arises, for example, in a pre-sharing of the key as may happened, for example, when the PAL is licensed.

In an example, interest packet (e.g., from the GAA device) and the second interest packet (e.g., from the PAL) are received within a threshold period. The threshold period defines what is considered simultaneous arrival of the two interest packets is. Here, publishing the identification packet includes transmitting the identification packet to the PAL. This satisfies the priority claim that the PAL has over GAA devices.

In an example, the second interest packet is received beyond a threshold period after the interest packet. Thus, in this example, the PAL interest packet was received after the GAA devices' interest packets. Thus, publishing the identification packet includes transmitting the identification packet to the GAA device. Thus, the first requester, without other knowledge at the system 105, will receive the identification packet. However, when the second interest packet from the PAL arrives, the priority of the PAL entails reclamation of the radio resources from the GAA devices that received the identification packet. Accordingly, the transceiver 110 is arranged to publish a reclamation packet to the GAA device, receive a reclamation acknowledgment, and transmit the indication packet to the PAL.

The discussion above demonstrates a system 105 that leverages ICN to provide efficient radio spectrum sharing among incumbent 135 providers and users 140. Instead of each party constantly polling or requesting to each other, the spectrum availability information or spectrum "need" information is placed into the ICN. The ICN publish and subscribe features naturally lend themselves to distributing spectrum information to interested parties. Thus, if an entity has unused spectrum that it wants to allow others to use, it sends out a packet with the list of available spectrum and the area and duration for which it is allowed. Entities that want to use additional spectrum subscribe to any such packets and receive the availability information. Filtering mechanisms may be used to screen for a particular location or time period, for example. For available unlicensed spectrum, multiple devices that see the packet may all use the same spectrum provided that they observe the location and time requirements. Thus, using the ICN implementation discussed above, one may effectively avoid complex implementations using dedicated network controllers or repositories and instead cache the information in the network, to be transmitted by the network as needed to interested parties.

Once a device or entity starts using the spectrum, it sends out an acknowledgement packet to indicate it is using the spectrum. In an example, when a number of acknowledgements expected is known, when a device subscribes to acknowledgement packets, it may indicate the number of acknowledgements it is expected to receive, or make it infinite, such that all acknowledgments in response to the availability packet will be forwarded to the subscriber. Thus, in an example, the interest (e.g., subscription) will not be removed from the PIT after it receives the first acknowledgment. This ensures that all the devices that use the frequency will be able to respond with an acknowledgment.

As noted above, the incumbent 135 may later send out a spectrum reclamation packet, for example when the spectrum is needed by the incumbent 135, and wait for all the devices (e.g., or only those that had sent an acknowledgment signifying that they are using the spectrum) to acknowledge the release of the spectrum, before beginning operations on the spectrum again.

Figure 2:
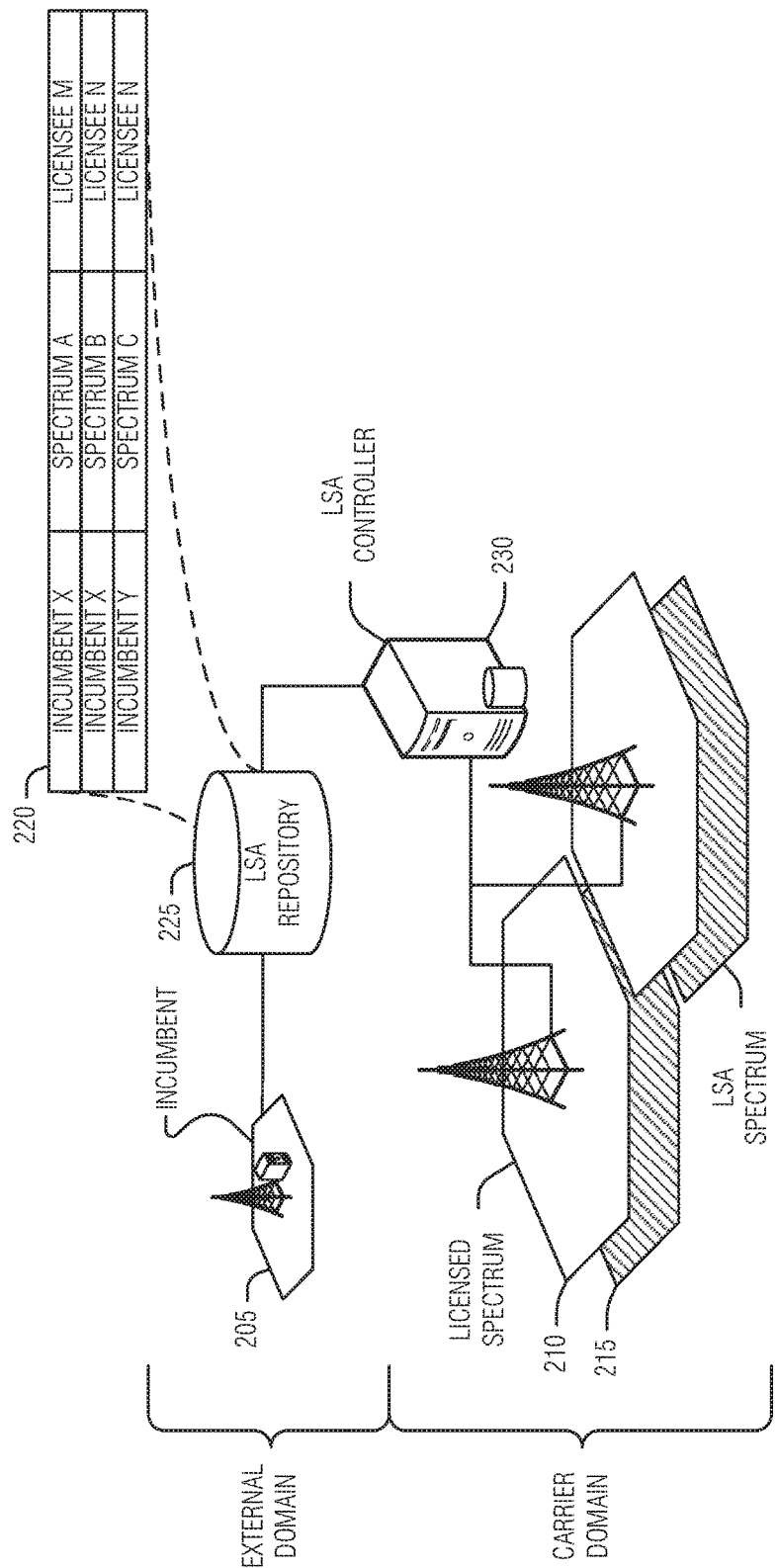
FIG. 2 illustrates a block diagram of an example of a system to implement LSA, according to an embodiment.

FIG. 2 illustrates a block diagram of an example of a system 200 to implement LSA, according to an embodiment. As shown in FIG. 2, the LSA architecture allows for incumbents 205 of licensed spectrum to sub-license their spectrum 215 to other licensees 210, such as operators. In the first phase of implementation, the spectrum sharing is based on one-to-one sharing on pre-determined bands and geographies. For instance, incumbent 205 may have an agreement with operator A 210 that within some part of their 20 MHz spectrum 215, Operator A 210 is to use 10 MHz of it 215 for 70% of the time, in City M. Further, when Incumbent 205 shares the spectrum 215 with Operator A 210, the Incumbent 205 cannot promise that same spectrum to any other Operator or Licensee. To accomplish coordination for LSA, new network entities in a new framework are introduced to perform the spectrum handoff from Incumbent 205 to Licensee 210. These new entities are the LSA controller 230 and the LSA repository 225.

The incumbents 205 update the LSA repository 225 when there is spectrum available and to whom it is licensed, for how long (if applicable), etc. This update is represented in the table 220 of FIG. 2. The LSA controller 203 looks at the updates 220 in the LSA repository 225 and informs the corresponding licensees 210 about the availability of the spectrum.

Figure 3:
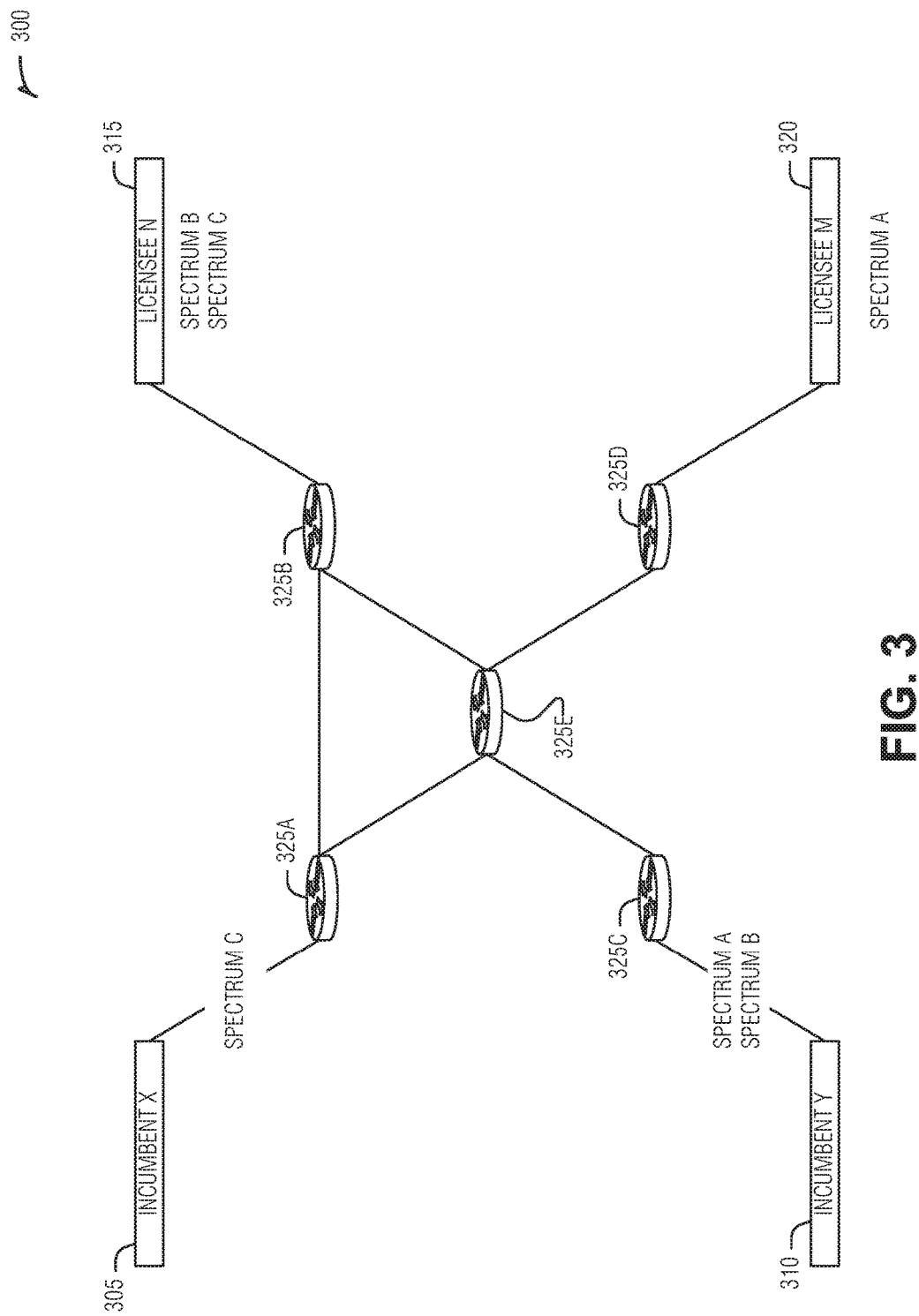
FIG. 3 illustrates an example of a system to implement LSA in an ICN, according to an embodiment.

FIG. 3 illustrates an example of a system 300 to implement LSA in an ICN, according to an embodiment. The LSA framework illustrated in FIG. 2 includes new network entities, along with a number of new messaging formats and communications protocols. An ICN aware system, such as the system 105 discussed above, may efficiently implement these entities (e.g., the LSA controller or LSA repository, or both). For example, the operators or LSA licensees (e.g., Licensee N 315 and Licensee M 320) send an interest packet (or equivalent) to the ICN devices 325 to subscribe to the incumbent (e.g., Incumbent X 305 or Incumbent Y 310). In an example, the interest packet includes a name or filtering information such that the subscription is only the incumbent to which the licensee has a prior agreement for sharing. Thus, as illustrated, Incumbent X 305 licenses Spectrum C to Licensee N 315. Incumbent Y 310 licenses Spectrum A to Licensee M 320 and Spectrum B to Licensee N 315. When an incumbent publishes the spectrum availability, such as in a data packet, the data packet gets routed by the ICN devices 325 to the corresponding operator. Thus, when Incumbent Y 310 responds to Licensee N's interest packet, the data packet response follows the pending interest through ICN device 325C. 325E, and 325B where the data packet response is delivered to Licensee N 315.

Incumbent X 305 may ensure that Spectrum C is only used by Licensee N 315 by encrypting the message appropriately. This encryption ensures that, even if the data response packet were delivered to Licensee M 320, only the licensee that is allowed to use the spectrum (e.g., Licensee N 315) has access to the message. Further, using this encryption technique may allow for data naming that is more general and thus more easily cached within the ICN devices 325 without concern that unlicensed operators may inadvertently use the spectrum.

As noted above, the incumbents subscribe to acknowledgement messages from the licensee once the incumbent publishes spectrum availability. After acknowledging that it is using the available spectrum, the licensee ensures that there is always an active interest packet for spectrum reclamation by the incumbent. That is, the licensee maintains an interest (e.g., ICN compliant request) that is held by the ICN devices 325 to which the incumbent may respond while the licensee is using the spectrum. If the incumbent wants to reclaim the spectrum, it simply publishes a data packet requesting that the spectrum be released and subscribes to acknowledgement messages from all the operators, or a subset who had originally sent an acknowledgement message that they are using the spectrum). Once the incumbent receives all the "spectrum released" messages that correspond to the original spectrum acknowledgment messages, the incumbent may be assured that all spectrum has been released by the operators and may continue its own operations on the spectrum.

Figure 4:
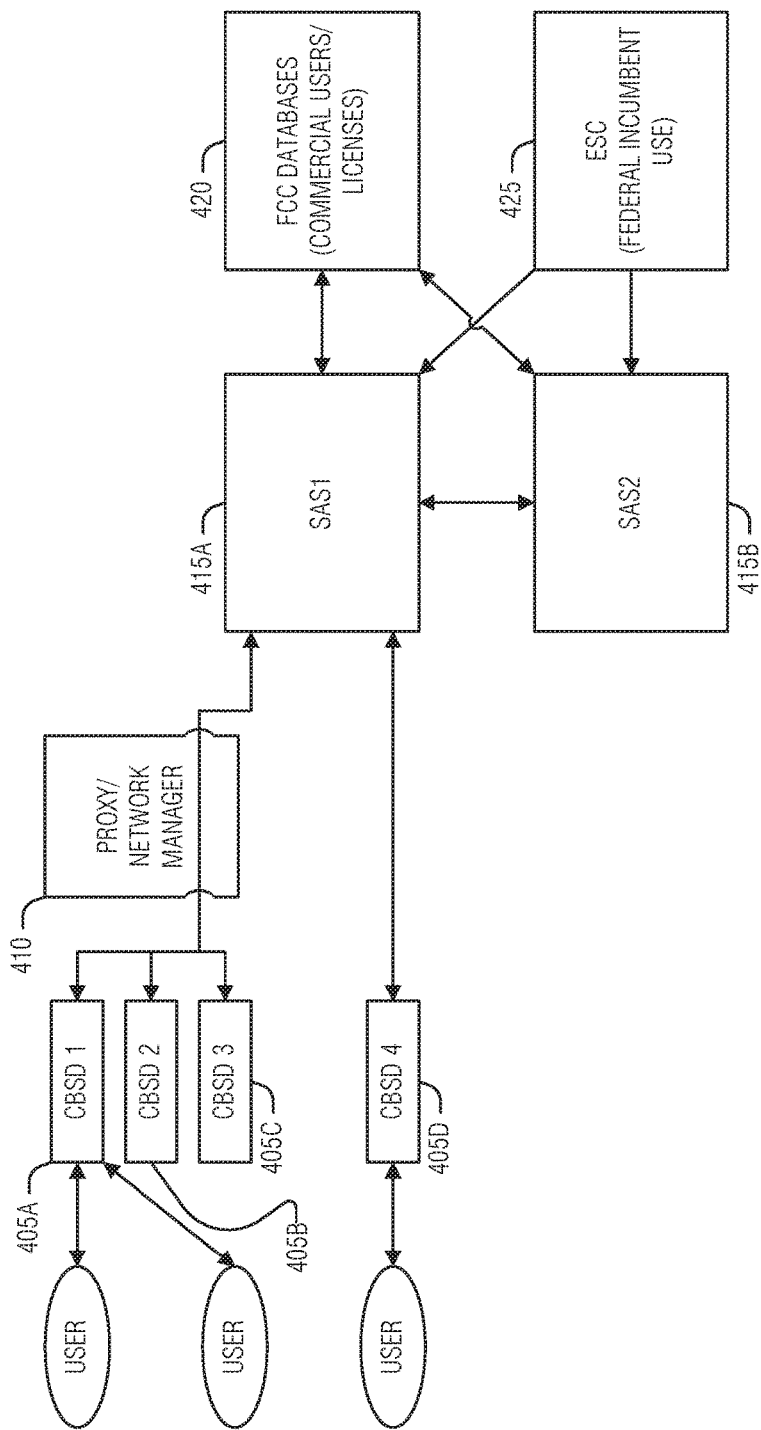
FIG. 4 illustrates an example of a system to implement SAS, according to an embodiment.

FIG. 4 illustrates an example of a system 400 to implement SAS, according to an embodiment. The U. S. Federal Communications Commission (FCC) released a Report and Order on Apr. 17, 2015 outlining the rules for operating wireless devices in the 3.5 GHz band that spans from 3550-3700 MHz (FCC 16-55A1). The FCC released this spectrum for sharing with incumbents of this frequency band. The incumbents (many of which are entities of the U.S. Department of Defense) get priority in that band but the band may be used by broadband devices when (and where) incumbents are not using the spectrum. The FCC also identified two additional tiers of spectrum users in addition to the incumbents: Priority Access (PA) and General Authorized Access (GAA). The Priority Access Licensees (PAL) (comparable to licensed users in the LSA discussion above) get protection from GAA users, and the GAA users are treated like users of unlicensed spectrum (e.g., 900 MHz, 2.5 GHz. or 5 GHz in the U.S.). However, incumbents have priority over both PAL and GAA devices.

The FCC also mandates a SAS 415 to coordinate the spectrum use between the incumbents, PAL, and GAA devices. The FCC's Report and Order outlines a sample system with SASs 415 as illustrated in FIG. 4. The SAS 415 performs spectrum and power allocation to the Citizens Broadband Service Devices (CBSDs) 405, for example via a network manager 410, and protects incumbents (e.g., incumbent 425). Which CBSDs 405 have GAA or PAL access may be maintained, for example, in a data warehouse 420 and provided to the SASs 415.

Although the FCC does not specify details of how the SASs 415 are to be implemented, or how they need to perform interference mitigation, any radio that operates in the 3.5 GHz band in the U.S. will need to follow this three tier system (e.g., incumbent, PAL, and GAA) and work with the SAS 415 to perform interference mitigation. A current implementation of SAS 415 relies on all the access points and base stations (e.g., CBSDs 405) to send a heartbeat message to the SAS 415 to be able to use the spectrum and to report operational details to the SAS 415, such as their location, transmit power etc. The SAS 415 then allocates the transmit power of each base station and access point in separate messages. Thus, for example, the SAS 415A transmits a separate allocation message to each of the CBSD 1 405A. CBSD 2 405B, CBSD 3 405C, and CBSD 4 405D. The SASs (e.g., SAS 415 A and 415B) periodically exchange information about all the base stations and access points in their network.

As noted above, the amount and type of communication in such a system is relatively large and quickly grows as the number of devices increases. In massive IoT implementations, as contemplated in fifth generation cellular (e.g., 5G) and beyond, it is expected that enormous numbers of devices will seek to share in available licensed spectrums. In such systems, the current implementation of SAS will not scale.

Figure 5:
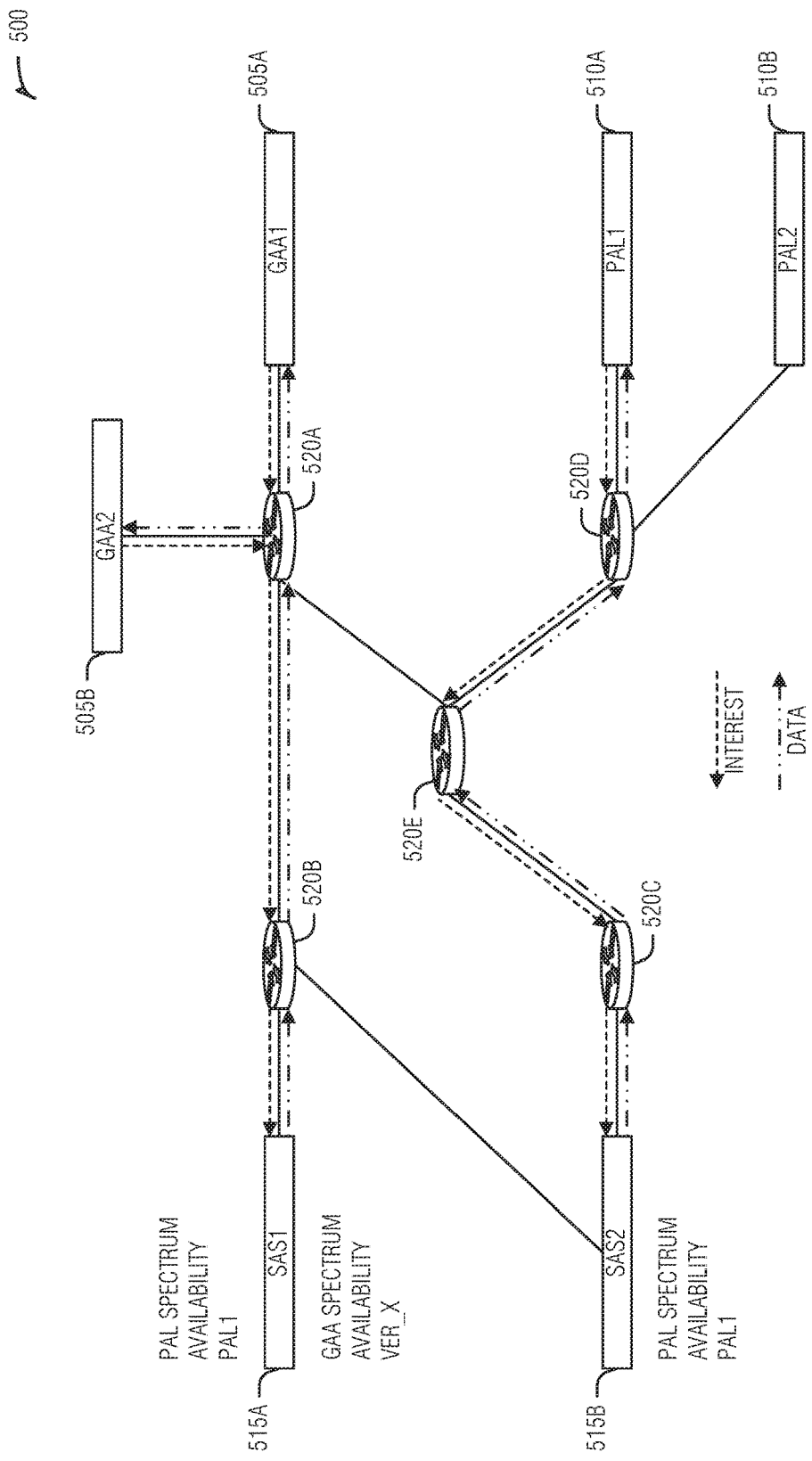
FIG. 5 illustrates an example of a system to implement SAS in an ICN, according to an embodiment.

FIG. 5 illustrates an example of a system 500 to implement SAS in an ICN, according to an embodiment. To implement SAS and address the issues discussed above with respect to FIG. 4, an ICN based information exchange will permit efficient scaling to a great many devices. The ICN approach allows for a distributed implementation of SAS that minimizes latency and is scalable across large number of devices. Spectrum allocation may be implemented by having individual PAL 510 and GAA 505 CBSDs register with their respective SASs 515. For example, GAA1 505A and GAA2 505B register with SAS1 515A, and PAL1 510A and PAL2 510B register with SAS2 515B. Once registration is complete, CBSDs are able to use the GAA or PAL spectrum when authorized by the SASs 515.

In the case of GAAs 505, to use the spectrum, the GAAs 505 send out an interest packet for GAA frequencies. Because the GAA spectrum is un-licensed, any registered device may access it. Due to the built-in security of many ICN implementations, SAS 1515A may send the list of available frequencies to both GAA1 505A and GAA2 505B even if GAA2 505B is not registered with SAS1 515A, because GAA2 505B will not have the key to unlock the information that GAA1 505A acquired during registration. Once the request of GAA1 505A is satisfied, in this example, the packet from SAS 1 515A is no longer needed. However, if there is a newer version of the list of frequencies available, then the content routers (e.g., ICN devices 520) automatically forward the newer version because the ICN devices 520 maintain a record of the last version forwarded.

When transmitting the list of frequencies, the name of the data may include a reference to the location for which the frequencies are valid. Thus, only the packets relevant to a GAA 505 will be forwarded to the GAA 505. For example, ICN device 520A will see that the list of frequencies that SAS 1 515A sends to GAA1 505A may also apply to GAA2 505B because both GAAs 505 meet the same location criteria. Thus, the same packet may be used to communicate the list of frequencies to GAA1 505A and GAA2 505B.

For the PALs 510, each SAS 515 allocates a separate frequency to each PAL request because the PALs 510 operate as if they have a license to the spectrum. For example, PAL1 510A registers with SAS1 515A, but is closer to SAS2 515B. When the interest packet requesting the frequency is sent to SAS 1 515A. SAS 1 515A may forward the list of all PAL frequencies that it manages to SAS2 515B, which then provides the appropriate frequency to PAL 1 510A. For PAL spectrum allocation, each PAL 510 has a separate key (unlike the GAAs 505 which all have a common key), and a PAL 510 for which the spectrum allocation was intended may unlock the data because it is encrypted with that PAL's key.

Acknowledgements and spectrum reclamation may operate as described above with respect to FIGS. 1 or 3. The ICN framework of the system 500 allows for distributed implementation of interference mitigation. For example, the SAS 515 that is closest to the GAAs 505 or PALs 510 may send the maximum power levels or the maximum interference levels that may be tolerated in a given location. The wireless devices monitor the channel and automatically reduce their power if they find the interference levels above a certain threshold.

Figure 6:
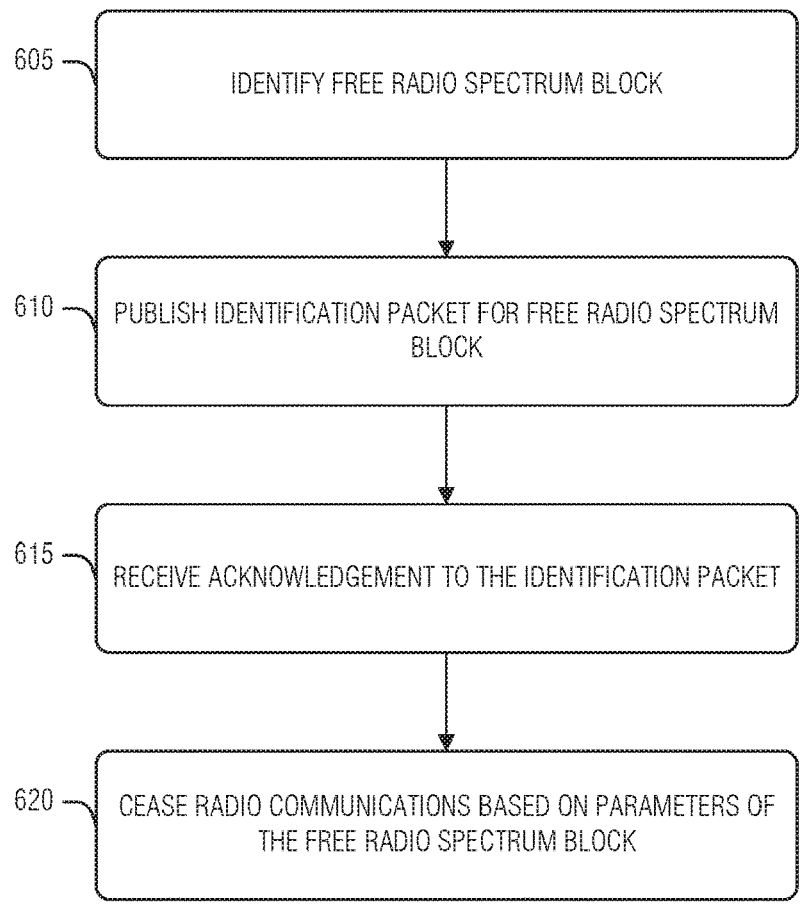
FIG. 6 illustrates a flow diagram of an example of a method for radio spectrum sharing, according to an embodiment.

FIG. 6 illustrates a flow diagram of an example of a method 600 for radio spectrum sharing, according to an embodiment.

At operation 605, a free radio spectrum block is identified.

At operation 610, an identification packet of the free radio spectrum block is published. In an example, the identification packet includes at least one of available spectrum, time, or area corresponding to the free radio spectrum block. In an example, if any of the previous three attributes are missing from the identification packet, a recipient will be able to determine the missing elements, by, for example, placing them in the name of the data, or by prior understanding.

At operation 615, an acknowledgment to the identification packet is received. The acknowledgment including an identification of the identification packet. In an example, the acknowledgment includes an identification of a user of a portion of the free radio spectrum block. In an example, receiving the acknowledgment to the identification packet includes subscribing to a pending interest that matches the identification packet. In an example, subscribing to the pending interest includes specifying a number of expected acknowledgements, the number of expected acknowledgments causing a pending interest controller to keep the pending interest for at least as many acknowledgments as specified.

At operation 620, a provider of the free radio spectrum block is caused (e.g., via notification) to cease radio communication on the available spectrum for the for the time and area specified in the identification packet.

The method 600 may be optionally extended to include operations to allow reclamation of radio resources from the free radio spectrum block. These operations may include determining a use for a portion of the free radio spectrum block (e.g., a previously unscheduled communication to make). A reclamation packet may then be published. Acknowledgements to the reclamation packet may be received, and, once a threshold number of acknowledgements have arrived, the resumption of radio communications by the provider may be caused. In an example, the threshold number of acknowledgements are equal to a number of acknowledgements received to the identification packet.

In an example, the identification packet includes an auction option. In this example, the method 600 may be extended to perform auction operations. These operations may include receiving a set of bid acknowledgments in response to the auction option. In an example, a bid acknowledgement in the set of bid acknowledgements includes a bid value and a nonce. The operations may also include applying a selection criterion to the set of bid acknowledgements to select a member of the set of bid acknowledgments as a winner and publishing an auction complete packet including the nonce of the member of the set of bid acknowledgements. In an example, the operations may also include publishing supplemental identification packets at the conclusion of each round of an auction. Here, each supplemental identification packet indicates a round winner via the nonce and bid value. The round winner is determined by the selection criterion. The operations may also include receiving supplemental bid acknowledgments in response to the supplemental identification packets until the auction expires.

In an example, identifying the free radio spectrum block (operation 605) includes obtaining a parameter of the free radio spectrum block from a licensed shared access (LSA) incumbent and receiving an interest packet from an LSA licensee. Here, the interest packet includes an indication of the parameter. In this example, publishing the identification packet (operation 610) includes transmitting the identification packet to the LSA licensee. In an example, transmitting the identification packet to the LSA licensee includes encrypting the identification packet with a key for the LSA licensee. In an example, the key is acquired prior to receipt of the interest packet.

In an example, the method 600 may be optionally extended to include transmitting a reclamation data packet in response to a reclamation interest packet maintained by the LSA licensee during a period of use of the free radio spectrum block by the LSA licensee. This example also includes the operation of causing resumption of use of a radio spectrum of the free radio spectrum block in response to a reclamation acknowledgment by the LSA licensee.

In an example, identifying the free radio spectrum block (operation 605) includes obtaining a parameter of the free radio spectrum block from an incumbent and receiving an interest packet from a GAA device. Here, the interest packet including an indication of the parameter. The extended operations may also include receiving a registration request from the GAA device and registering the GAA device. In an example, registering the GAA device includes providing the GAA device with an encryption key to decrypt the identification message. In an example, the encryption key is common across GAA devices that are registered. In an example, the encryption key is common across SASs.

In an example, identifying the free radio spectrum block (operation 605) includes receiving a second interest packet from a PAL, the interest packet including an indication of the parameter. In this example, the method 600 may be optionally extended to include receiving a registration request from the PAL and registering the PAL. In an example, registering the PAL includes providing the PAL with an encryption key to decrypt the identification message. In an example, the encryption key is unique to the PAL and a SAS providing the registration. In an example, the encryption key is globally unique to the PAL (e.g., unique to the PAL without regard to any SAS to which the PAL is registered or, for example, without regard to time).

In an example, the interest packet and the second interest packet are received within a threshold period. In this example, publishing the identification packet (operation 610) includes transmitting the identification packet to the PAL. In an example, the second interest packet is received beyond a threshold period after the interest packet. In this example, publishing the identification packet (operation 610) includes transmitting the identification packet to the GAA device. Also in this example, the method 600 may be optionally extended to include publishing a reclamation packet to the GAA device, receiving a reclamation acknowledgment, and transmitting the indication packet to the PAL.

In an example, publishing the identification packet (operation 610) includes transmitting the identification packet to the GAA device. In an example, publishing the identification packet (operation 610) includes transmitting the identification packet to multiple GAA devices.

In an example, the identification packet includes a version indication. In an example, the identification packet includes a geographical location (e.g., area) in its name (e.g., the name of the data).

Benefits of the systems and methods for radio spectrum sharing discussed above include a single system (e.g., device, apparatus, etc.) for sharing radio spectrum information between heterogeneous entities. This same device may implement a variety of selection criteria, such as performing auctions to determine an ultimate user of the free radio spectrum. Further, the implementation discussed herein decreases time scales in spectrum sharing which results in more efficient use of spectrum. Additionally, implementations of LSA or SAS provide a more performant architecture without adding new network entities, which greatly reduces complexity of the sharing system. Moreover, the ability of the disclosed system to scale to extremely large network fan-outs, as is likely in massive IoT deployments, outperform current LSA or SAS designs. Also important to such complex network architectures, the disclosed systems enables spectrum sharing across heterogeneous networks (e.g., wireless area network (WLAN), cellular, other wireless, or wired networks) to a single, reliable, and simple protocol for all.

Figure 7:
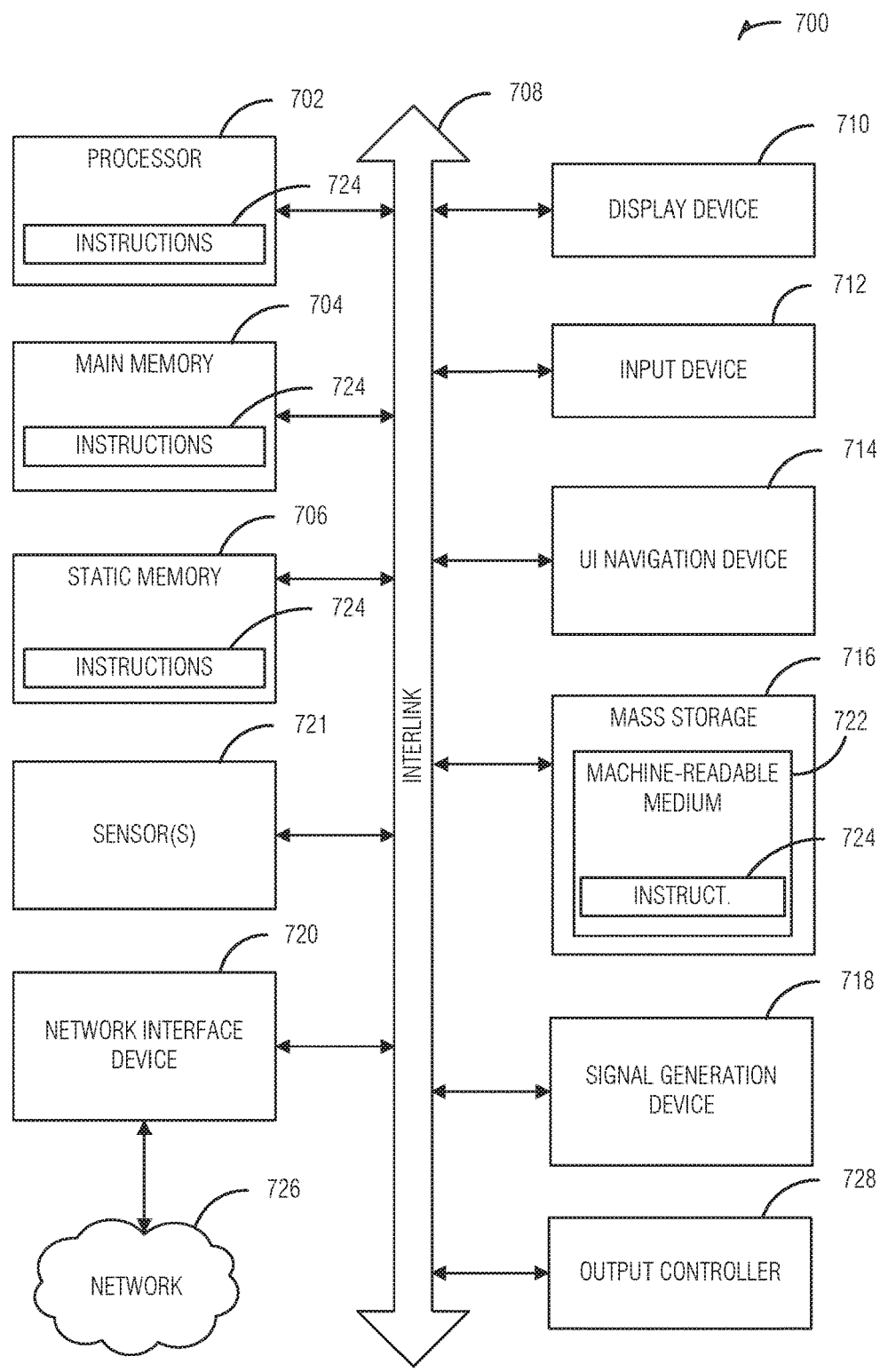
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks: magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL NOTES & EXAMPLES

Example 1 is a system for radio spectrum sharing, the system comprising: a scheduler to: identify a free radio spectrum block; and cause a provider of the free radio spectrum block to cease radio communication on available spectrum for a time and area specified in an identification packet; and a transceiver to: publish the identification packet of the free radio spectrum block, the identification packet including at least one of the available spectrum, the time, or the area corresponding to the free radio spectrum block; and receive an acknowledgement to the identification packet.

In Example 2, the subject matter of Example 1 optionally includes wherein the scheduler is to: determine a use for a portion of the free radio spectrum block; and cause resumption of radio communication on the available spectrum in response to receipt of a threshold number of acknowledgements to a reclamation packet; and wherein the transceiver is to: publish the reclamation packet; and receive acknowledgements to the reclamation packet.

In Example 3, the subject matter of Example 2 optionally includes wherein the threshold number of acknowledgements are equal to a number of acknowledgements received to the identification packet.

In Example 4, the subject matter of any one or more of Examples 1-3 optionally include wherein, to receive the acknowledgment to the identification packet, the transceiver is to: subscribe to a pending interest that matches the identification packet.

In Example 5, the subject matter of Example 4 optionally includes wherein, to subscribe to the pending interest, the transceiver is to: specify a number of expected acknowledgements, the number of expected acknowledgments cause a pending interest controller to keep the pending interest for at least as many acknowledgments as specified.

In Example 6, the subject matter of any one or more of Examples 1-5 optionally include wherein the identification packet includes an auction option.

In Example 7, the subject matter of Example 6 optionally includes wherein the transceiver is to: receive a set of bid acknowledgments in response to the auction option, wherein a bid acknowledgement in the set of bid acknowledgements includes a bid value and a nonce; and publish an auction complete packet including the nonce of a member of the set of bid acknowledgements; and wherein the scheduler is to: apply a selection criterion to the set of bid acknowledgements to select the member of the set of bid acknowledgments as a winner.

In Example 8, the subject matter of Example 7 optionally includes wherein the transceiver is to: publish supplemental identification packets at the conclusion of each round of an auction, each supplemental identification packet indicating a round winner via the nonce and bid value, the round winner determined by the selection criterion; and receive supplemental bid acknowledgments in response to the supplemental identification packets until the auction expires.

In Example 9, the subject matter of any one or more of Examples 1-8 optionally include wherein, to identify the free radio spectrum block, the scheduler is to: obtain a parameter of the free radio spectrum block from a licensed shared access (LSA) incumbent; wherein the transceiver is to: receive an interest packet from an LSA licensee, the interest packet including an indication of the parameter; and wherein, to publish the identification packet, the transceiver is to transmit the identification packet to the LSA licensee.

In Example 10, the subject matter of Example 9 optionally includes wherein, to transmit the identification packet to the LSA licensee, the transceiver is to: encrypt the identification packet with a key for the LSA licensee, the key acquired prior to receipt of the interest packet.

In Example 11, the subject matter of any one or more of Examples 9-10 optionally include wherein the transceiver is to: transmit a reclamation data packet in response to a reclamation interest packet maintained by the LSA licensee during a period of use of the free radio spectrum block by the LSA licensee; and wherein the scheduler is to: cause resumption of use of a radio spectrum of the free radio spectrum block in response to a reclamation acknowledgment by the LSA licensee.

In Example 12, the subject matter of any one or more of Examples 1-11 optionally include wherein, to identify the free radio spectrum block, the scheduler is to: obtain a parameter of the free radio spectrum block from an incumbent; and wherein the transceiver is to: receive an interest packet from a general authorized access (GAA) device, the interest packet including an indication of the parameter.

In Example 13, the subject matter of Example 12 optionally includes wherein the transceiver is to: receive a registration request from the GAA device; and wherein the scheduler is to: register the GAA device.

In Example 14, the subject matter of Example 13 optionally includes wherein, to register the GAA device, the scheduler is to: provide the GAA device with an encryption key to decrypt the identification message.

In Example 15, the subject matter of Example 14 optionally includes wherein the encryption key is common across GAA devices that are registered.

In Example 16, the subject matter of Example 15 optionally includes wherein the encryption key is common across spectrum access systems (SASs).

In Example 17, the subject matter of any one or more of Examples 12-16 optionally include wherein, to identify the free radio spectrum block, the transceiver is to: receive a second interest packet from a priority access licensee (PAL), the interest packet including an indication of the parameter.

In Example 18, the subject matter of Example 17 optionally includes wherein the scheduler is to: receive a registration request from the PAL; and register the PAL.

In Example 19, the subject matter of Example 18 optionally includes wherein, to register the PAL, the scheduler is to: provide the PAL with an encryption key to decrypt the identification message, wherein the encryption key is unique to the PAL and a spectrum access systems (SAS) that provided the registration.

In Example 20, the subject matter of Example 19 optionally includes wherein the encryption key is globally unique to the PAL.

In Example 21, the subject matter of any one or more of Examples 17-20 optionally include wherein the interest packet and the second interest packet are received within a threshold period, and wherein, to publish the identification packet, the transceiver is to: transmit the identification packet to the PAL.

In Example 22, the subject matter of Example 21 optionally includes wherein the second interest packet is received beyond a threshold period after the interest packet, wherein, to publish the identification packet, the transceiver is to: transmit the identification packet to the GAA device; publish a reclamation packet to the GAA device; receive a reclamation acknowledgment; and transmit the indication packet to the PAL.

In Example 23, the subject matter of any one or more of Examples 12-22 optionally include wherein, to publish the identification packet, the transceiver is to: transmit the identification packet to the GAA device.

In Example 24, the subject matter of any one or more of Examples 12-23 optionally include wherein, to publish the identification packet, the transceiver is to: transmit the identification packet to multiple GAA devices.

In Example 25, the subject matter of any one or more of Examples 12-24 optionally include wherein, to obtain the parameter of the free radio block from the incumbent, the scheduler is to: register with a system of the incumbent.

In Example 26, the subject matter of any one or more of Examples 12-25 optionally include wherein the identification packet includes a version indication.

In Example 27, the subject matter of any one or more of Examples 12-26 optionally include wherein the identification has a name with a geographical location.

In Example 28, the subject matter of any one or more of Examples 1-27 optionally include wherein the acknowledgment identifies a user of a portion of the free radio spectrum block.

Example 29 is a method for radio spectrum sharing, the method comprising: identifying, via a scheduler, a free radio spectrum block: publishing, via a transceiver, an identification packet of the free radio spectrum block, the identification packet including at least one of available spectrum, time, or area corresponding to the free radio spectrum block; receiving, via the transceiver, an acknowledgement to the identification packet; and causing, via the scheduler, a provider of the free radio spectrum block to cease radio communication on the available spectrum for the time and area specified in the identification packet.

In Example 30, the subject matter of Example 29 optionally includes determining, via the scheduler, a use for a portion of the free radio spectrum block; publishing, via the transceiver, a reclamation packet; receiving, via the transceiver, acknowledgements to the reclamation packet; and causing resumption of radio communication on the available spectrum in response to receiving a threshold number of acknowledgements to the reclamation packet.

In Example 31, the subject matter of Example 30 optionally includes wherein the threshold number of acknowledgements are equal to a number of acknowledgements received to the identification packet.

In Example 32, the subject matter of any one or more of Examples 29-31 optionally include wherein receiving the acknowledgment to the identification packet includes subscribing to a pending interest that matches the identification packet.

In Example 33, the subject matter of Example 32 optionally includes wherein subscribing to the pending interest includes specifying a number of expected acknowledgements, the number of expected acknowledgments causing a pending interest controller to keep the pending interest for at least as many acknowledgments as specified.

In Example 34, the subject matter of any one or more of Examples 29-33 optionally include wherein the identification packet includes an auction option.

In Example 35, the subject matter of Example 34 optionally includes receiving a set of bid acknowledgments in response to the auction option, wherein a bid acknowledgement in the set of bid acknowledgements includes a bid value and a nonce; applying a selection criterion to the set of bid acknowledgements to select a member of the set of bid acknowledgments as a winner; and publishing an auction complete packet including the nonce of the member of the set of bid acknowledgements.

In Example 36, the subject matter of Example 35 optionally includes publishing supplemental identification packets at the conclusion of each round of an auction, each supplemental identification packet indicating a round winner via the nonce and bid value, the round winner determined by the selection criterion; and receiving supplemental bid acknowledgments in response to the supplemental identification packets until the auction expires.

In Example 37, the subject matter of any one or more of Examples 29-36 optionally include wherein identifying the free radio spectrum block includes: obtaining a parameter of the free radio spectrum block from a licensed shared access (LSA) incumbent; and receiving an interest packet from an LSA licensee, the interest packet including an indication of the parameter; and wherein publishing the identification packet includes transmitting the identification packet to the LSA licensee.

In Example 38, the subject matter of Example 37 optionally includes wherein transmitting the identification packet to the LSA licensee includes encrypting the identification packet with a key for the LSA licensee, the key acquired prior to receipt of the interest packet.

In Example 39, the subject matter of any one or more of Examples 37-38 optionally include transmitting a reclamation data packet in response to a reclamation interest packet maintained by the LSA licensee during a period of use of the free radio spectrum block by the LSA licensee; and causing resumption of use of a radio spectrum of the free radio spectrum block in response to a reclamation acknowledgment by the LSA licensee.

In Example 40, the subject matter of any one or more of Examples 29-39 optionally include wherein identifying the free radio spectrum block includes: obtaining a parameter of the free radio spectrum block from an incumbent; and receiving an interest packet from a general authorized access (GAA) device, the interest packet including an indication of the parameter.

In Example 41, the subject matter of Example 40 optionally includes receiving a registration request from the GAA device; and registering the GAA device.

In Example 42, the subject matter of Example 41 optionally includes wherein registering the GAA device includes providing the GAA device with an encryption key to decrypt the identification message.

In Example 43, the subject matter of Example 42 optionally includes wherein the encryption key is common across GAA devices that are registered.

In Example 44, the subject matter of Example 43 optionally includes wherein the encryption key is common across spectrum access systems (SASs).

In Example 45, the subject matter of any one or more of Examples 40-44 optionally include wherein identifying the free radio spectrum block includes: receiving a second interest packet from a priority access licensee (PAL), the interest packet including an indication of the parameter.

In Example 46, the subject matter of Example 45 optionally includes receiving a registration request from the PAL; and registering the PAL.

In Example 47, the subject matter of Example 46 optionally includes wherein registering the PAL includes providing the PAL with an encryption key to decrypt the identification message, wherein the encryption key is unique to the PAL and a spectrum access systems (SAS) providing the registration.

In Example 48, the subject matter of Example 47 optionally includes wherein the encryption key is globally unique to the PAL.

In Example 49, the subject matter of any one or more of Examples 45-48 optionally include wherein the interest packet and the second interest packet are received within a threshold period, and wherein publishing the identification packet includes transmitting the identification packet to the PAL.

In Example 50, the subject matter of Example 49 optionally includes wherein the second interest packet is received beyond a threshold period after the interest packet, wherein publishing the identification packet includes transmitting the identification packet to the GAA device, and wherein the method comprises: publishing a reclamation packet to the GAA device; receiving a reclamation acknowledgment; and transmitting the indication packet to the PAL.

In Example 51, the subject matter of any one or more of Examples 40-50 optionally include wherein publishing the identification packet includes transmitting the identification packet to the GAA device.

In Example 52, the subject matter of any one or more of Examples 40-51 optionally include wherein publishing the identification packet includes transmitting the identification packet to multiple GAA devices.

In Example 53, the subject matter of any one or more of Examples 40-52 optionally include wherein obtaining the parameter of the free radio block from the incumbent includes registering with a system of the incumbent.

In Example 54, the subject matter of any one or more of Examples 40-53 optionally include wherein the identification packet includes a version indication.

In Example 55, the subject matter of any one or more of Examples 40-54 optionally include wherein the identification has a name with a geographical location.

In Example 56, the subject matter of any one or more of Examples 29-55 optionally include wherein the acknowledgment identifies a user of a portion of the free radio spectrum block.

Example 57 is at least one machine readable medium including instructions that, when executed by processing circuitry, cause the processing circuitry to perform any method of Examples 29-56.

Example 58 is a system comprising means to perform any method of Examples 29-56.

Example 59 is at least one machine readable medium including instructions for radio spectrum sharing, the instructions, when executed by processing circuitry, cause the processing circuitry to perform operations comprising: identifying a free radio spectrum block; publishing an identification packet of the free radio spectrum block, the identification packet including at least one of available spectrum, time, or area corresponding to the free radio spectrum block; receiving an acknowledgement to the identification packet; and causing a provider of the free radio spectrum block to cease radio communication on the available spectrum for the time and area specified in the identification packet.

In Example 60, the subject matter of Example 59 optionally includes wherein the operations comprise: determining a use for a portion of the free radio spectrum block; publishing a reclamation packet; receiving acknowledgements to the reclamation packet; and causing resumption of radio communication on the available spectrum in response to receiving a threshold number of acknowledgements to the reclamation packet.

In Example 61, the subject matter of Example 60 optionally includes wherein the threshold number of acknowledgements are equal to a number of acknowledgements received to the identification packet.

In Example 62, the subject matter of any one or more of Examples 59-61 optionally include wherein receiving the acknowledgment to the identification packet includes subscribing to a pending interest that matches the identification packet.

In Example 63, the subject matter of Example 62 optionally includes wherein subscribing to the pending interest includes specifying a number of expected acknowledgements, the number of expected acknowledgments causing a pending interest controller to keep the pending interest for at least as many acknowledgments as specified.

In Example 64, the subject matter of any one or more of Examples 59-63 optionally include wherein the identification packet includes an auction option.

In Example 65, the subject matter of Example 64 optionally includes receiving a set of bid acknowledgments in response to the auction option, wherein a bid acknowledgement in the set of bid acknowledgements includes a bid value and a nonce; applying a selection criterion to the set of bid acknowledgements to select a member of the set of bid acknowledgments as a winner; and publishing an auction complete packet including the nonce of the member of the set of bid acknowledgements.

In Example 66, the subject matter of Example 65 optionally includes publishing supplemental identification packets at the conclusion of each round of an auction, each supplemental identification packet indicating a round winner via the nonce and bid value, the round winner determined by the selection criterion; and receiving supplemental bid acknowledgments in response to the supplemental identification packets until the auction expires.

In Example 67, the subject matter of any one or more of Examples 59-66 optionally include wherein identifying the free radio spectrum block includes: obtaining a parameter of the free radio spectrum block from a licensed shared access (LSA) incumbent: and receiving an interest packet from an LSA licensee, the interest packet including an indication of the parameter; and wherein publishing the identification packet includes transmitting the identification packet to the LSA licensee.

In Example 68, the subject matter of Example 67 optionally includes wherein transmitting the identification packet to the LSA licensee includes encrypting the identification packet with a key for the LSA licensee, the key acquired prior to receipt of the interest packet.

In Example 69, the subject matter of any one or more of Examples 67-68 optionally include wherein the operations comprise: transmitting a reclamation data packet in response to a reclamation interest packet maintained by the LSA licensee during a period of use of the free radio spectrum block by the LSA licensee; and causing resumption of use of a radio spectrum of the free radio spectrum block in response to a reclamation acknowledgment by the LSA licensee.

In Example 70, the subject matter of any one or more of Examples 59-69 optionally include wherein identifying the free radio spectrum block includes: obtaining a parameter of the free radio spectrum block from an incumbent: and receiving an interest packet from a general authorized access (GAA) device, the interest packet including an indication of the parameter.

In Example 71, the subject matter of Example 70 optionally includes wherein the operations comprise: receiving a registration request from the GAA device: and registering the GAA device.

In Example 72, the subject matter of Example 71 optionally includes wherein registering the GAA device includes providing the GAA device with an encryption key to decrypt the identification message.

In Example 73, the subject matter of Example 72 optionally includes wherein the encryption key is common across GAA devices that are registered.

In Example 74, the subject matter of Example 73 optionally includes wherein the encryption key is common across spectrum access systems (SASs).

In Example 75, the subject matter of any one or more of Examples 70-74 optionally include wherein identifying the free radio spectrum block includes: receiving a second interest packet from a priority access licensee (PAL), the interest packet including an indication of the parameter.

In Example 76, the subject matter of Example 75 optionally includes wherein the operations comprise: receiving a registration request from the PAL; and registering the PAL.

In Example 77, the subject matter of Example 76 optionally includes wherein registering the PAL includes providing the PAL with an encryption key to decrypt the identification message, wherein the encryption key is unique to the PAL and a spectrum access systems (SAS) providing the registration.

In Example 78, the subject matter of Example 77 optionally includes wherein the encryption key is globally unique to the PAL.

In Example 79, the subject matter of any one or more of Examples 75-78 optionally include wherein the interest packet and the second interest packet are received within a threshold period, and wherein publishing the identification packet includes transmitting the identification packet to the PAL.

In Example 80, the subject matter of Example 79 optionally includes wherein the second interest packet is received beyond a threshold period after the interest packet, wherein publishing the identification packet includes transmitting the identification packet to the GAA device, and wherein the operations comprise: publishing a reclamation packet to the GAA device; receiving a reclamation acknowledgment; and transmitting the indication packet to the PAL.

In Example 81, the subject matter of any one or more of Examples 70-80 optionally include wherein publishing the identification packet includes transmitting the identification packet to the GAA device.

In Example 82, the subject matter of any one or more of Examples 70-81 optionally include wherein publishing the identification packet includes transmitting the identification packet to multiple GAA devices.

In Example 83, the subject matter of any one or more of Examples 70-82 optionally include wherein obtaining the parameter of the free radio block from the incumbent includes registering with a system of the incumbent.

In Example 84, the subject matter of any one or more of Examples 70-83 optionally include wherein the identification packet includes a version indication.

In Example 85, the subject matter of any one or more of Examples 70-84 optionally include wherein the identification has a name with a geographical location.

In Example 86, the subject matter of any one or more of Examples 59-85 optionally include wherein the acknowledgment identifies a user of a portion of the free radio spectrum block.

Example 87 is a system for radio spectrum sharing, the system comprising: means for identifying a free radio spectrum block; means for publishing an identification packet of the free radio spectrum block, the identification packet including at least one of available spectrum, time, or area corresponding to the free radio spectrum block; means for receiving an acknowledgement to the identification packet; and means for causing a provider of the free radio spectrum block to cease radio communication on the available spectrum for the time and area specified in the identification packet.

In Example 88, the subject matter of Example 87 optionally includes means for determining a use for a portion of the free radio spectrum block; means for publishing a reclamation packet; means for receiving acknowledgements to the reclamation packet; and means for causing resumption of radio communication on the available spectrum in response to receiving a threshold number of acknowledgements to the reclamation packet.

In Example 89, the subject matter of Example 88 optionally includes wherein the threshold number of acknowledgements are equal to a number of acknowledgements received to the identification packet.

In Example 90, the subject matter of any one or more of Examples 87-89 optionally include wherein the means for receiving the acknowledgment to the identification packet include means for subscribing to a pending interest that matches the identification packet.

In Example 91, the subject matter of Example 90 optionally includes wherein the means for subscribing to the pending interest includes means for specifying a number of expected acknowledgements, the number of expected acknowledgments causing a pending interest controller to keep the pending interest for at least as many acknowledgments as specified.

In Example 92, the subject matter of any one or more of Examples 87-91 optionally include wherein the identification packet includes an auction option.

In Example 93, the subject matter of Example 92 optionally includes means for receiving a set of bid acknowledgments in response to the auction option, wherein a bid acknowledgement in the set of bid acknowledgements includes a bid value and a nonce; means for applying a selection criterion to the set of bid acknowledgements to select a member of the set of bid acknowledgments as a winner; and means for publishing an auction complete packet including the nonce of the member of the set of bid acknowledgements.

In Example 94, the subject matter of Example 93 optionally includes means for publishing supplemental identification packets at the conclusion of each round of an auction, each supplemental identification packet indicating a round winner via the nonce and bid value, the round winner determined by the selection criterion; and means for receiving supplemental bid acknowledgments in response to the supplemental identification packets until the auction expires.

In Example 95, the subject matter of any one or more of Examples 87-94 optionally include wherein the means for identifying the free radio spectrum block include: means for obtaining a parameter of the free radio spectrum block from a licensed shared access (LSA) incumbent; and means for receiving an interest packet from an LSA licensee, the interest packet including an indication of the parameter; and wherein the means for publishing the identification packet include means for transmitting the identification packet to the LSA licensee.

In Example 96, the subject matter of Example 95 optionally includes wherein the means for transmitting the identification packet to the LSA licensee include means for encrypting the identification packet with a key for the LSA licensee, the key acquired prior to receipt of the interest packet.

In Example 97, the subject matter of any one or more of Examples 95-96 optionally include means for transmitting a reclamation data packet in response to a reclamation interest packet maintained by the LSA licensee during a period of use of the free radio spectrum block by the LSA licensee; and means for causing resumption of use of a radio spectrum of the free radio spectrum block in response to a reclamation acknowledgment by the LSA licensee.

In Example 98, the subject matter of any one or more of Examples 87-97 optionally include wherein the means for identifying the free radio spectrum block include: means for obtaining a parameter of the free radio spectrum block from an incumbent; and means for receiving an interest packet from a general authorized access (GAA) device, the interest packet including an indication of the parameter.

In Example 99, the subject matter of Example 98 optionally includes means for receiving a registration request from the GAA device; and means for registering the GAA device.

In Example 100, the subject matter of Example 99 optionally includes wherein the means for registering the GAA device include means for providing the GAA device with an encryption key to decrypt the identification message.

In Example 101, the subject matter of Example 100 optionally includes wherein the encryption key is common across GAA devices that are registered.

In Example 102, the subject matter of Example 101 optionally includes wherein the encryption key is common across spectrum access systems (SASs).

In Example 103, the subject matter of any one or more of Examples 98-102 optionally include wherein the means for identifying the free radio spectrum block include: means for receiving a second interest packet from a priority access licensee (PAL), the interest packet including an indication of the parameter.

In Example 104, the subject matter of Example 103 optionally includes means for receiving a registration request from the PAL; and means for registering the PAL.

In Example 105, the subject matter of Example 104 optionally includes wherein the means for registering the PAL include means for providing the PAL with an encryption key to decrypt the identification message, wherein the encryption key is unique to the PAL and a spectrum access systems (SAS) providing the registration.

In Example 106, the subject matter of Example 105 optionally includes wherein the encryption key is globally unique to the PAL.

In Example 107, the subject matter of any one or more of Examples 103-106 optionally include wherein the interest packet and the second interest packet are received within a threshold period, and wherein the means for publishing the identification packet include means for transmitting the identification packet to the PAL.

In Example 108, the subject matter of Example 107 optionally includes wherein the second interest packet is received beyond a threshold period after the interest packet, wherein the means for publishing the identification packet include means for transmitting the identification packet to the GAA device, and wherein the system comprises: means for publishing a reclamation packet to the GAA device; means for receiving a reclamation acknowledgment; and means for transmitting the indication packet to the PAL.

In Example 109, the subject matter of any one or more of Examples 98-108 optionally include wherein the means for publishing the identification packet include means for transmitting the identification packet to the GAA device.

In Example 110, the subject matter of any one or more of Examples 98-109 optionally include wherein the means for publishing the identification packet include means for transmitting the identification packet to multiple GAA devices.

In Example 111, the subject matter of any one or more of Examples 98-110 optionally include wherein the means for obtaining the parameter of the free radio block from the incumbent include means for registering with a system of the incumbent.

In Example 112, the subject matter of any one or more of Examples 98-111 optionally include wherein the identification packet includes a version indication.

In Example 113, the subject matter of any one or more of Examples 98-112 optionally include wherein the identification has a name with a geographical location.

In Example 114, the subject matter of any one or more of Examples 87-113 optionally include wherein the acknowledgment identifies a user of a portion of the free radio spectrum block.

Example 115 is a system comprising means to perform any of Examples 1-114.

Example 116 is a machine readable medium including instructions that, when executed by processing circuitry, cause the processing circuitry to perform or implement any of Examples 1-114.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first." "second." and "third." etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for radio spectrum sharing, the system comprising:
   a scheduler to:
      identify a free radio spectrum block;
      cause a provider of the free radio spectrum block to cease radio communication on available spectrum for a time and area specified in an identification packet;
      determine a use for a portion of the free radio spectrum block when radio communications are ceased for the freed radio spectrum block: and
      cause resumption of radio communication on the available spectrum in response to receipt of a threshold number of acknowledgements to a reclamation packet; and
   a transceiver to:
      publish the identification packet of the free radio spectrum block, the identification packet including at least one of the available spectrum, the time, or the area corresponding to the free radio spectrum block;
      receive an acknowledgement to the identification packet;
      publish the reclamation packet; and
      receive acknowledgements to the reclamation packet.

2. The system of claim 1, wherein the threshold number of acknowledgements are equal to a number of acknowledgements received to the identification packet.

3. The system of claim 1, wherein, to receive the acknowledgment to the identification packet, the transceiver is to:
   subscribe to a pending interest that matches the identification packet.

4. The system of claim 3, wherein, to subscribe to the pending interest, the transceiver is to:
   specify a number of expected acknowledgements, the number of expected acknowledgments cause a pending interest controller to keep the pending interest for at least as many acknowledgments as specified.

5. The system of claim 1, wherein, to identify the free radio spectrum block, the scheduler is to:
   obtain a parameter of the free radio spectrum block from a licensed shared access (LSA) incumbent; and
   wherein the transceiver is to:
      receive an interest packet from an LSA licensee, the interest packet including an indication of the parameter; and
      wherein, to publish the identification packet, the transceiver is to transmit the identification packet to the LSA licensee.

6. The system of claim 5, wherein, to transmit the identification packet to the LSA licensee, the transceiver is to:
   encrypt the identification packet with a key for the LSA licensee, the key acquired prior to receipt of the interest packet.

7. The system of claim 5, wherein the transceiver is to:
   transmit a reclamation data packet in response to a reclamation interest packet maintained by the LSA licensee during a period of use of the free radio spectrum block by the LSA licensee; and wherein the scheduler is to:
   cause resumption of use of a radio spectrum of the free radio spectrum block in response to a reclamation acknowledgment by the LSA licensee.

8. The system of claim 1, wherein, to identify the free radio spectrum block, the scheduler is to:
   obtain a parameter of the free radio spectrum block from an incumbent; and
   wherein the transceiver is to:
      receive an interest packet from a general authorized access (GAA) device, the interest packet including an indication of the parameter.

9. The system of claim 8, wherein, to identify the free radio spectrum block, the transceiver is to:
   receive a second interest packet from a priority access licensee (PAL), the interest packet including an indication of the parameter.

10. The system of claim 9 wherein the scheduler is to:
    receive a registration request from the PAL; and
    register the PAL.

11. A method for radio spectrum sharing, the method comprising:
    identifying, via a scheduler, a free radio spectrum block;
    publishing, via a transceiver, an identification packet of the free radio spectrum block, the identification packet including at least one of available spectrum, time, or area corresponding to the free radio spectrum block;
    receiving, via the transceiver, an acknowledgement to the identification packet;
    causing a provider of the free radio spectrum block to cease radio communication on the available spectrum for the time arid area specified in the identification packet;
    determining a use for a portion of the free radio spectrum block;
    publishing a reclamation packet;
    receiving acknowledgements to the reclamation packet; and
    causing resumption of radio communication on the available spectrum in response to receiving, a threshold number of acknowledgements to the reclamation packet.

12. The method of claim 11, wherein identifying the free radio spectrum block includes:
    obtaining a parameter of the free radio spectrum block from an incumbent; and
    receiving an interest packet from a general authorized access (GAA) device, the interest packet including an indication of the parameter.

13. The method of claim 12, wherein identifying the free radio spectrum block includes:
    receiving a second interest packet from a priority access licensee (PAL), the interest packet including an indication of the parameter.

14. The method of claim 11, wherein receiving the acknowledgment to the identification packet includes subscribing to a pending interest that matches the identification packet.

15. The method of claim 14, wherein subscribing to the pending interest includes specifying a number of expected acknowledgements, the number of expected acknowledgments causing a pending interest controller to keep the pending interest for at least as many acknowledgments as specified.

16. At least one non-transitory machine readable medium including instructions for radio spectrum sharing, the instructions, when executed by processing circuitry, cause the processing circuitry to perform operations comprising:
- identifying a free radio spectrum block;
- publishing an identification packet of the free radio spectrum block, the identification packet including at least one of available spectrum, time, or area corresponding to the free radio spectrum block;
- receiving an acknowledgement to the identification packet;
- causing a provider of the free radio spectrum block to cease radio communication on the available spectrum for the time and area specified in the identification packet;
- determining a use for a portion of the free radio spectrum block;
- publishing a reclamation packet;
- receiving acknowledgements to the reclamation packet; and
- causing resumption of radio communication on the available spectrum in response to receiving a threshold number of acknowledgements to the reclamation packet.

17. The at least one non-transitory machine readable medium of claim 16, wherein the threshold number of acknowledgements are equal to a number of acknowledgements received to the identification packet.

18. The at least one non-transitory machine readable medium of claim 16, wherein receiving the acknowledgment to the identification packet includes subscribing to a pending interest that matches the identification packet.

19. The at least one non-transitory machine readable medium of claim 18, wherein subscribing to the pending interest includes specifying a number of expected acknowledgements, the number of expected acknowledgments causing a pending interest controller to keep the pending interest for at least as many acknowledgments as specified.

20. The at least one non-transitory machine readable medium of claim 16, wherein identifying the free radio spectrum block includes:
- obtaining a parameter of the free radio spectrum block from a licensed shared access (ISA) incumbent; and
- receiving an interest packet from an LSA licensee, the interest packet including an indication of the parameter; and
- wherein publishing the identification packet includes transmitting the identification packet to the LSA licensee.

21. The at least one non-transitory machine readable medium of claim 20, wherein transmitting the identification packet to the LSA licensee includes encrypting the identification packet with a key for the LSA licensee, the key acquired prior to receipt of the interest packet.

22. The at least one non-transitory machine readable medium of claim 20, wherein the operations comprise:
- transmitting a reclamation data packet in response to a reclamation interest packet maintained by the LSA licensee during a period of use of the free radio spectrum block by the LSA licensee; and
- causing resumption of use of a radio spectrum of the free radio spectrum block in response to a reclamation acknowledgment by the LSA licensee.

23. The at least one non-transitory machine readable medium of claim 16, wherein identifying the free radio spectrum block includes:
- obtaining a parameter of the free radio spectrum block from an incumbent; and
- receiving an interest packet from a general authorized access (GAA) device, the interest packet including an indication of the parameter.

24. The at least one non-transitory machine readable medium of claim 23, wherein identifying the free radio spectrum block includes:
- receiving a second interest packet from a priority access licensee (PAL), the interest packet including an indication of the parameter.

25. The at least one non-transitory machine readable medium of claim 24, wherein the operations comprise:
- receiving a registration request from the PAL; and
- registering the PAL.

* * * * *

UNITED STATES PATENT AND TRADEMARK OFFICE
CERTIFICATE OF CORRECTION

PATENT NO. : 10,225,743 B2
APPLICATION NO. : 15/413985
DATED : March 5, 2019
INVENTOR(S) : Srikanteswara et al.

Page 1 of 1

It is certified that error appears in the above-identified patent and that said Letters Patent is hereby corrected as shown below:

In the Claims

In Column 30, Line 19, in Claim 10, after "claim 9", insert --,--

In Column 30, Line 33, in Claim 11, delete "arid" and insert --and-- therefor

In Column 30, Line 41, in Claim 11, delete "receiving," and insert --receiving-- therefor In Column 31, Line 41, in Claim 20, delete "(ISA)" and insert --(LSA)-- therefor Signed and Sealed this
Twenty-third Day of July, 2019

Andrei Iancu
*Director of the United States Patent and Trademark Office*